United States Patent
Beutin et al.

(10) Patent No.: US 6,938,407 B2
(45) Date of Patent: Sep. 6, 2005

(54) BLEED-OFF DEVICE IN A BYPASS TURBOJET

(75) Inventors: Bruno Beutin, Corbeil-Essonnes (FR); Michel Gilbert Roland Brault, Boussy Saint-Antoine (FR); Pascal Gérard Gervais, Boissise la Bertrand (FR); Monique Andrée Thore, Crosnes (FR)

(73) Assignee: SNECMA-Moteurs, Paris (FR)

( * ) Notice: Subject to any disclaimer, the term of this patent is extended or adjusted under 35 U.S.C. 154(b) by 266 days.

(21) Appl. No.: 10/284,181

(22) Filed: Oct. 31, 2002

(65) Prior Publication Data

US 2003/0079465 A1 May 1, 2003

(30) Foreign Application Priority Data

Oct. 31, 2001 (FR) .............................. 01 14097

(51) Int. Cl.[7] ................................. F02K 3/02
(52) U.S. Cl. ................... 60/226.1; 60/262; 60/785
(58) Field of Search ........................ 60/226.1, 262, 60/263, 264, 785

(56) References Cited

U.S. PATENT DOCUMENTS

| | | |
|---|---|---|
| 4,086,761 A | 5/1978 | Schaut et al. |
| 5,044,153 A | 9/1991 | Mouton |
| 5,119,625 A | 6/1992 | Glowacki |
| 5,123,240 A | 6/1992 | Frost et al. |
| 5,261,228 A * | 11/1993 | Shuba ................ 60/226.3 |
| 5,269,135 A | 12/1993 | Vermejan et al. |
| 5,279,109 A * | 1/1994 | Liu et al. ................ 60/785 |
| 6,622,475 B2 * | 9/2003 | Brault et al. ............ 60/226.3 |

FOREIGN PATENT DOCUMENTS

| | | |
|---|---|---|
| EP | 0 374 004 A1 | 6/1990 |
| EP | 0 407 297 A1 | 1/1991 |
| EP | 0 539 285 A1 | 4/1993 |
| EP | 0 902 179 A2 | 3/1999 |
| GB | 2 259 328 | 3/1993 |

* cited by examiner

*Primary Examiner*—Cheryl Tyler
*Assistant Examiner*—William H. Rodriguez
(74) *Attorney, Agent, or Firm*—Oblon, Spivak, McClelland, Maier & Neustadt, P.C.

(57) ABSTRACT

This object is achieved by the bleed-off means comprising means for tapping air from the primary duct which are arranged upstream of the intermediate casing and means for evacuating the air tapped into the secondary duct downstream of the support arms, these means comprising conduits arranged around the intermediate casing under the platforms.

20 Claims, 1 Drawing Sheet

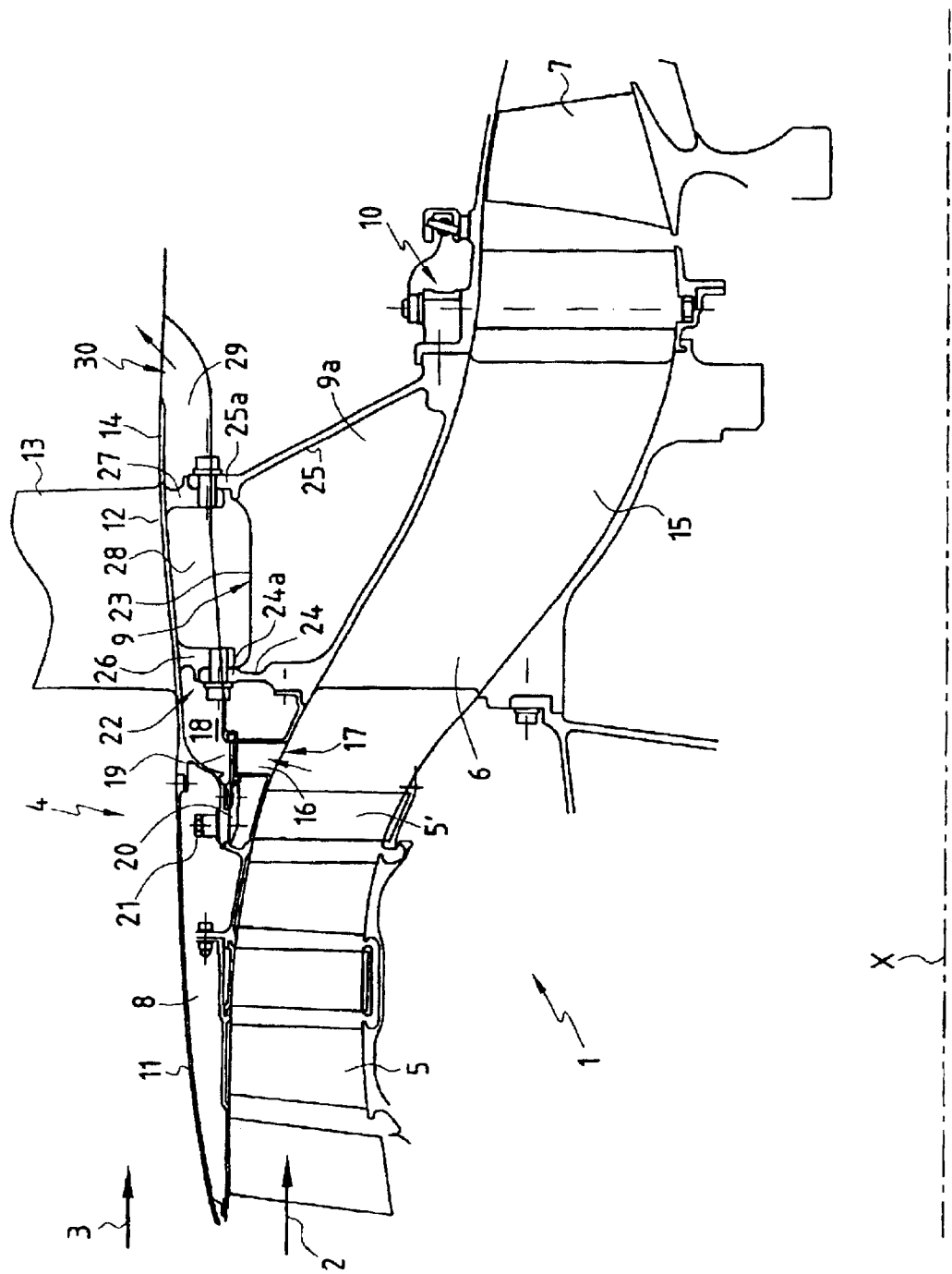

BLEED-OFF DEVICE IN A BYPASS TURBOJET

BACKGROUND OF THE INVENTION

1. Field of the Invention

The invention relates to the field of aviation bypass turbojets.

It relates more particularly to a bypass turbojet comprising, a primary duct, a secondary duct, a low-pressure compressor, a high-pressure compressor, and a structural intermediate casing arranged axially between said low-pressure compressor and said high-pressure compressor, said intermediate casing being equipped at its periphery with a plurality of support arms having platforms which internally delimit the secondary duct, in which bleed-off means are provided, allowing some of a gaseous stream delivered by the low-pressure compressor to be tapped off and led to the secondary duct.

The intermediate casing also has, in its radially internal part, a plurality of radial arms connecting the annular walls internally and externally delimiting the primary duct. These radial arms are intended to transmit to the support arms, via the radially external part of the intermediate casing, the forces exerted by the fan and the low-pressure compressor on their bearings, these bearings being carried by shrouds secured to the internal annular wall of the intermediate casing.

In addition, the intermediate casing generally bears a device for driving the turbojet equipment.

The intermediate casing has to have great mechanical strength while at the same time remaining light in weight. This intermediate casing is generally produced in a single piece as a casting or as a welded mechanical construction.

In a bypass turbojet with a high bypass ratio, there is provided, in the primary stream from upstream to downstream in the direction in which the gases flow, a low-pressure compressor followed by a high-pressure compressor which conveys compressed air to a combustion chamber in which the air is mixed with pressurized fuel. There, the fuel is burnt to yield, downstream of the chamber, energy for a high-pressure turbine which drives the high-pressure compressor, then for a low-pressure turbine which drives the fan and the low-pressure compressor. The gases leaving the turbines supply residual thrust which is added to the thrust generated by the gases flowing through the secondary duct. It is these thrusts which are needed to propel the aircraft.

Under certain flight conditions, at part load, for example, while the aircraft is descending, the amount of air delivered by the low-pressure compressor may be too high for the engine to operate correctly. Thus it is necessary to divert some of this air to the secondary duct, to avoid the phenomenon known as surge which is due to the detachment of the fluid streams along the vanes, as this leads to instability in the flow.

Furthermore, when the aircraft is passing through high-volume clouds, quantities of water in the form of rain or hail may then enter the compressors. If the engine is at wide-open throttle, the combustion chamber is supplied with a high fuel delivery, and the water is vaporized and is in a sufficiently hot and atomized vapor state not to extinguish the combustion chamber. By contrast, if the aircraft is in the descent or approach phase prior to landing, because the engine is running at idle, the amount of fuel delivered is relatively low, and the compression ratio of the compressors is relatively low. Water in the liquid or solid state may therefore reach the combustion chamber and extinguish combustion of one of the burners, or even all of them. This can have serious consequences.

2. Summary of the Prior Art

This is why bleed-off devices for turbojets are generally equipped with mobile scoops which, under the action of complex control members, can enter the primary duct in the annular space separating the low-pressure compressor from the high-pressure compressor. This annular space axially has the shape of a swan neck, and the particles of water which, because of their specific mass, run along the external wall of the primary duct are trapped by the scoops and diverted to the secondary duct.

GB 2 259 328 discloses such a bleed-off device in which the scoops are actuated by a synchronization device arranged in the intermediate casing so as to direct the tapped air and the particles toward fixed tubes which remove them into the secondary duct downstream of the support arms of the engine.

EP 0 407 297 provides, in the internal and external walls of the inter-duct casing, hatches actuated in synchronism and able to move radially outward.

EP 0 374 004 also provides, in the external wall of the primary duct, hatches associated with a scooping device.

In all these bleed-off devices, the members for controlling the scoops and the hatches are arranged in the inter-duct casing and operate in synchronism. These control members, comprising a control ring, link rods, hydraulic rams and cables to actuate articulated scoops or hatches, are relatively complicated and also difficult to access during inevitable servicing and maintenance operations.

The arrangement of these scoops or hatches and of the control members on the intermediate casing necessitates the intermediate casing comprising means for supporting the articulations of these devices, and this makes the intermediate casing considerably more complicated and considerably more difficult to machine.

SUMMARY OF THE INVENTION

It is an object of the invention to allow the intermediate casing to be simplified.

A bypass turbojet includes a primary duct, a secondary duct, a low-pressure compressor, a high-pressure compressor, and a structural intermediate casing arranged axially between the low-pressure compressor and the high-pressure compressor. The intermediate casing is equipped at its periphery with a plurality of support arms having platforms which internally delimit the secondary ducts. A bleed-off device allows some of the gaseous stream delivered by the low-pressure compressor to be tapped off and led to the secondary duct. The bleed-off device includes a mechanism for tapping air from the primary duct which is arranged upstream of the intermediate casing and a mechanism for evacuating the tapped air into the secondary duct downstream of the support arms. The mechanism for evacuating includes conduits arranged around the intermediate casing under the platforms.

Thus, the intermediate casing according to the invention has no means for fixing mechanical elements of the bleed-off device, nor does it have holes in its flanges for the passage of tubes, but the invention nonetheless allows the bleed-off air to be removed downstream of the support arms, thus avoiding aerodynamic disturbances at the roots of the support arms and losses of engine performance.

The invention therefore allows a simplification and reduction in cost of the intermediate casing and better transition of forces because the flanges of the intermediate casing do not have tubes passing through them, without increasing the mass.

BRIEF DESCRIPTION OF THE DRAWING

The single FIGURE is half a longitudinal cross-sectional view through the intermediate casing and the upstream part of the primary duct, showing the bleed-off device of a bypass turbojet according to the invention.

As illustrated in the drawing, a bypass turbojet 1 of axis X comprises, in its front zone, a fan, not shown in the drawing, which supplies air to a primary air duct 2 and to a secondary air duct 3 both of which are annular and separated by an inter-duct casing 4.

Installed in succession from upstream to downstream in the primary duct 2 are a low-pressure compressor 5, an annular conduit 6 with a swan neck cross-sectional shape, and a high-pressure compressor 7 which delivers compressed air to a combustion chamber, not shown in the drawing.

The inter-duct casing 4 comprises, from upstream to downstream, a stream-dividing spoiler 8, the internal wall of which constitutes the stator of the low-pressure compressor 5, a structural intermediate casing 9 which, in its radially internal region, comprises the annular swan neck-shaped conduit 6, and the stator 10 of the high-pressure compressor 7.

The secondary duct 3 is delimited internally by the external wall 11 of the spoiler 8, internal platforms 12 of support arms 13 of the engine which pass through the secondary duct 3, and cowlings 14 surrounding the stator 10 of the high-pressure compressor 7.

The intermediate casing 9 has, within the annular conduit 6, a plurality of radial arms 15 intended to transmit the forces generated by the fan to the support arms 13 via the annular part 9a of the intermediate casing 9 which surrounds the annular conduit 6.

According to the invention, the dividing spoiler 8 comprises, in its internal region near the intermediate casing 9, and downstream of the last row of fixed vanes 5' of the low-pressure compressor 5, an annular manifold 16 which communicates with the primary duct via a plurality of orifices 17 in the internal wall of the spoiler 8.

This manifold 16 can be placed in communication with a plurality of radial conduits 18 within the spoiler 8, via a control ring 19 turned by an operating arm 20 articulated about an axis 21 and able to be pivoted by a ram rod, for example. Moving the ram rod back and forth causes the control ring 19 to pivot back and forth about the axis X between two extreme positions.

The control ring comprises a plurality of orifices which, when the control ring 19 is in one extreme position, face inlet orifices of the radial conduits 18 and which, when the control ring 19 is in the other extreme position, are closed off by an annular internal wall of the spoiler 8 which connects the inlet orifices of the radial conduits 18 together. These radial conduits 18 are in fact elbowed in the downstream direction and have outlet orifices 22 which open in an aerial direction under the internal platforms 12 of the support arms 13. It is thus possible to tap bleed-off air from the primary duct 2 and remove it via the conduits 18 at a rate which is controlled by adjusting the control ring 19.

As can be seen in the drawing, the peripheral wall 23 of the intermediate casing is arranged some distance from the internal platforms 12. The radial flanges 24 and 25 which define the upstream and downstream faces of the radially external part of the intermediate casing 9 comprise pierced lugs 24a, 25a situated radially on the outside of the peripheral wall 23. The lugs 24a, 25a are attached using bolts to tabs 26, 27 which extend radially inward from beneath the platforms 12 of the support arms 13, thereby securing the intermediate casing 9 to the support arms 13.

The outlet orifices 22 of the conduits 18 open under the platforms 12 between two adjacent sets of tabs and lugs 24a, 26.

Axial tubes 28 are fixed under the platforms 12 or at the periphery of the intermediate casing 9 facing the outlet orifices 22 of the conduits 18 so as to ensure continuity of the bleed-off air removal conduits.

These axial tubes 28 also open downstream of the intermediate casing 9 between two adjacent sets of tabs and lugs 25a, 27, facing conduits 29 provided under the cowling 14 surrounding the stator 10 of the high-pressure compressor and which open via orifices 30 downstream of the support arms 13 in the secondary duct 3.

We claim:

1. A bypass turbojet comprising:
  a primary duct;
  a secondary duct;
  a low-pressure compressor;
  a high-pressure compressor;
  a structural intermediate casing arranged axially between said low-pressure compressor and said high-pressure compressor, said structural intermediate casing comprising a radial flange defining an upstream face of said structural intermediate casing, said structural intermediate casing being equipped at its periphery with a plurality of support arms having platforms which internally delimit the secondary duct, and
  bleed-off means allowing some of a gaseous stream delivered by said low-pressure compressor to be tapped off and led to said secondary duct, said bleed-off means comprising:
    means for tapping air from said primary duct, said means for tapping being arranged upstream of said radial flange of said intermediate casing, and
    means for evacuating said tapped air into said secondary duct downstream of said support arms, said means for evacuating comprising conduits arranged around said structural intermediate casing under said platforms.

2. The bypass turbojet according to claim 1, wherein said bleed-off means is not mechanically fixed to said structural intermediate casing.

3. The bypass turbojet according to claim 1, wherein said structural intermediate casing is free of any hole in its radial flanges.

4. The bypass turbojet according to claim 1, wherein said primary duct further comprises an annular conduit with a swan neck cross-sectional shape.

5. The bypass turbojet according to claim 1, further comprising an inter-duct casing separating said primary and said secondary ducts.

6. The bypass turbojet according to claim 5, wherein said structural intermediate casing is located within said inter-duct casing.

7. The bypass turbojet according to claim 1, wherein said bleed-off means further comprises a control ring controlling a rate at which said gaseous stream is tapped off.

8. The bypass turbojet according to claim 1, wherein said structural intermediate casing bears a device for driving a turbojet equipment.

9. The bypass turbojet according to claim 1, wherein said structural intermediate casing further comprises radial arms configured to transmit to the support arms forces exerted by a fan and said low-pressure compressor on their bearings.

10. A bypass turbojet comprising:
- a primary duct;
- a secondary duct;
- a low-pressure compressor;
- a high-pressure compressor;
- a structural intermediate casing arranged axially between said low-pressure compressor and said high-pressure compressor, said structural intermediate casing comprising a radial flange defining an upstream face of said structural intermediate casing, and
- a manifold in communication with said primary duct and said secondary duct, said manifold being in communication with said primary duct at a position axially upstream of said radial flange.

11. The bypass turbojet according to claim 10, wherein aid structural intermediate casing comprises at its periphery a support arm having a platform which delimit the secondary duct.

12. The bypass turbojet according to claim 10, wherein said manifold is in communication with said secondary duct axially downstream of said structural intermediate casing.

13. The bypass turbojet according to claim 10, wherein said manifold comprises a conduit arranged around said intermediate casing.

14. The bypass turbojet according to claim 10, wherein said manifold is not mechanically fixed to said structural intermediate casing.

15. The bypass turbojet according to claim 10, wherein said structural intermediate casing is free of any hole in its radial flanges.

16. The bypass turbojet according to claim 10, wherein said primary duct further comprises an annular conduit with a swan neck cross-sectional shape.

17. The bypass turbojet according to claim 10, further comprising a inter-duct casing separating said primary and said secondary ducts.

18. The bypass turbojet according to claim 17, wherein said structural intermediate casing is located within said inter-duct casing.

19. The bypass turbojet according to claim 10, wherein said manifold further comprises a control mechanism which controls a rate at which gaseous stream is tapped off from said primary duct.

20. The bypass turbojet according to claim 10, wherein said structural intermediate casing bears a device for driving a turbojet equipment.

* * * * *

UNITED STATES PATENT AND TRADEMARK OFFICE
CERTIFICATE OF CORRECTION

PATENT NO.   : 6,938,407 B2
DATED        : September 6, 2005
INVENTOR(S)  : Bruno Beutin et al.

It is certified that error appears in the above-identified patent and that said Letters Patent is hereby corrected as shown below:

Column 5,
Line 20, change "aid" to -- said --.

Signed and Sealed this

Seventh Day of March, 2006

JON W. DUDAS
*Director of the United States Patent and Trademark Office*